United States Patent [19]

Kitaguchi et al.

[11] Patent Number: 4,532,103
[45] Date of Patent: Jul. 30, 1985

[54] APPARATUS FOR MEASURING CONCENTRATION OF RADIOACTIVITY

[75] Inventors: Hiroshi Kitaguchi, Ibaraki; Masashi Kudo, Hitachi; Masaaki Fujii, Katsuta, all of Japan

[73] Assignee: Hitachi, Ltd., Tokyo, Japan

[21] Appl. No.: 324,549

[22] Filed: Nov. 24, 1981

[30] Foreign Application Priority Data

Dec. 1, 1980 [JP] Japan ................. 55-167984

[51] Int. Cl.³ .............................................. G21C 17/00
[52] U.S. Cl. .................................. 376/245; 376/310; 250/364
[58] Field of Search ............... 376/245, 310; 250/364, 250/430, 431, 432 R

[56] References Cited

U.S. PATENT DOCUMENTS

| | | | |
|---|---|---|---|
| 3,423,587 | 1/1969 | Goupil .............................. | 250/364 |
| 4,020,329 | 4/1977 | Church et al. ..................... | 376/245 |
| 4,092,541 | 5/1978 | Niedl ................................ | 376/245 |
| 4,107,533 | 8/1978 | Tabuchi et al. .................... | 376/245 |
| 4,112,301 | 9/1978 | Annis et al. ....................... | 250/364 |

FOREIGN PATENT DOCUMENTS

| | | |
|---|---|---|
| 52-55581 | 5/1977 | Japan . |
| 52-137595 | 11/1977 | Japan . |
| 54-43788 | 4/1979 | Japan ................ 376/245 |

Primary Examiner—Sal Cangialosi
Attorney, Agent, or Firm—Beall Law Offices

[57] ABSTRACT

An apparatus for measuring the concentration of radioactivity in a radioactive fluid discharged from a nuclear power plant. The apparatus comprises a radioactivity concentration measurement pipe arranged to extend vertically, fluid supplying means for supplying the fluid into the measurement pipe in such a manner that the fluid flows down through the measurement pipe along the axis of the measurement pipe without contacting the inner surface of the latter, radioactivity concentration measuring means disposed at the outside of the measurement pipe for measuring the radioactivity concentration in the fluid flowing in the measurement pipe, and means for discharging the radioactive fluid to the outside of the measurement pipe. The apparatus further comprises a gas supply pipe opening at its one end to the atmosphere and communicated at its other end with the inside of the measurement pipe, and a check valve disposed in the gas supply pipe and operated at a pressure higher than the atmospheric pressure. When the pressure in the measurement pipe has come down below the atmospheric pressure, the check valve is operative to always maintain the internal pressure in the measurement pipe at the atmospheric pressure, thereby to prevent the fluid level in the measurement pipe from being raised to reduce the background noise during the measurement of the radioactivity concentration.

8 Claims, 8 Drawing Figures

APPARATUS FOR MEASURING CONCENTRATION OF RADIOACTIVITY

BACKGROUND OF THE INVENTION

The present invention relates to an apparatus for measuring the concentration of radioactivity of a radioactive fluid flowing in a pipe and, more particularly, to an apparatus for measuring the concentration of radioactivity in the water discharged from a nuclear power plant.

In nuclear power plants and other facilities treating radioactivity, it is necessary to measure the concentration of the radioactivity of liquids flowing in various pipes. For instance, in the nuclear power plants, any abnormality in the plant is detected through the measurement of the radioactivity, to prevent dangerous wasting of liquid of high radioactivity concentration to the outside of the plant.

Japanese Patent Laid Open Nos. 55581/77 and 137595/77 disclose apparatus for measuring the radioactivity concentration in the radioactive fluids flowing in the pipes of nuclear power plants.

In these apparatus, the water discharge pipe through which the radioactive fluid as the measuring object flows is arranged to extend vertically. A measurement pipe, which has a diameter greater than the water discharge pipe, is arranged coaxially with the water discharge pipe so that the radioactive liquid may naturally fall into the measurement pipe along the axis of the latter. The end of the water discharge pipe extends into the measurement pipe, so that the radioactive liquid does not make direct contact with the inner surface of the measurement pipe. In consequence, the accumulation of radioactive substances on the pipe surface is avoided. A radioactive ray detector is disposed at the outside of the measurement pipe, and measures the radioactivity concentration in the radioactive liquid without making contact with the measurement pipe. The water which has passed through the measurement pipe is discharged through a discharge opening via a water outlet pipe provided at the outlet side of the measurement pipe and then a discharge water stop valve.

In this arrangement, however, it is often experienced that the water level rises within the length of the measurement pipe when a large flow resistance is imposed by the water pipe due to, for example, a too large distance between the water discharge opening and the position where the detector is situated. In such a case, it is difficult to maintain a steady flow of water without permitting the direct contact between the water and the inner surface of the measurement pipe.

In this known measuring apparatus, therefore, it is necessary to maintain the air in the measurement pipe at the atmospheric pressure. It is, therefore, necessary to install the detector at the outlet portion of the water outlet pipe disposed at the outlet side of the measurement pipe or to dispose a tank having a free water surface beneath the region where the water falls without contacting the inner surface of the measurement pipe. It is, however, difficult to obtain sufficient installation spaces for the detector and the water tank at such locations. This difficulty or problem equally applies to the measurement of radioactivity concentration in ordinary pipes other than the water discharge pipe.

SUMMARY OF THE INVENTION

Accordingly, an object of the invention is to provide an improved radioactivity concentration measuring apparatus which can be installed at any desired portion of the pipe, thereby to overcome the abovedescribed problems of the prior art.

The undesirable rise of the water level in the measurement pipe of the prior art apparatus takes place in the following process. When the water is supplied into the measurement pipe in a stepped manner at constant rates, the pressure in the measurement pipe is temporarily increased to a level higher than the atmospheric pressure in response to an increase of the flow rate. The pressure, however, is set at the level of the atmospheric pressure as the time lapses and, thereafter, the pressure is lowered gradually below the atmospheric pressure due to an involvement or trapping of air which takes place in the restriction of the pipe at the downstream side of the measurement pipe. The negative pressure thus established acts to raise the water level in the measurement pipe.

According to the invention, the establishment of negative pressure or vacuum in the measurement pipe is suitably suppressed to effectively avoid the rise of the water level.

Namely, in the radioactivity concentration measuring apparatus of the invention, an air supply pipe having a check valve is connected to the measurement pipe so as to selectively provide a communication between the air layer in the measurement pipe and the ambient air. The check valve is opened when the pressure in the measurement pipe is lowered to a vacuum, to permit the ambient air to be sucked into the measurement pipe to recover the atmospheric pressure in the measurement pipe. To the contrary, when the pressure in the measurement pipe is higher than the atmospheric pressure, the check valve closes the air supply pipe to prevent the air from coming out of the measurement pipe. In consequence, the generation of vacuum in the measurement pipe is suppressed to prevent the undesirable rise of the water level. This arrangement, therefore, permits the water to flow down steadily without contacting the inner surface of the measurement pipe, which in turn makes it possible to continuously measure the radioactivity concentration by means of the radioactive ray detector surrounded by a shield, as well as the radioactivity meter.

DESCRIPTION OF THE PREFERRED EMBODIMENTS

Figure 1:
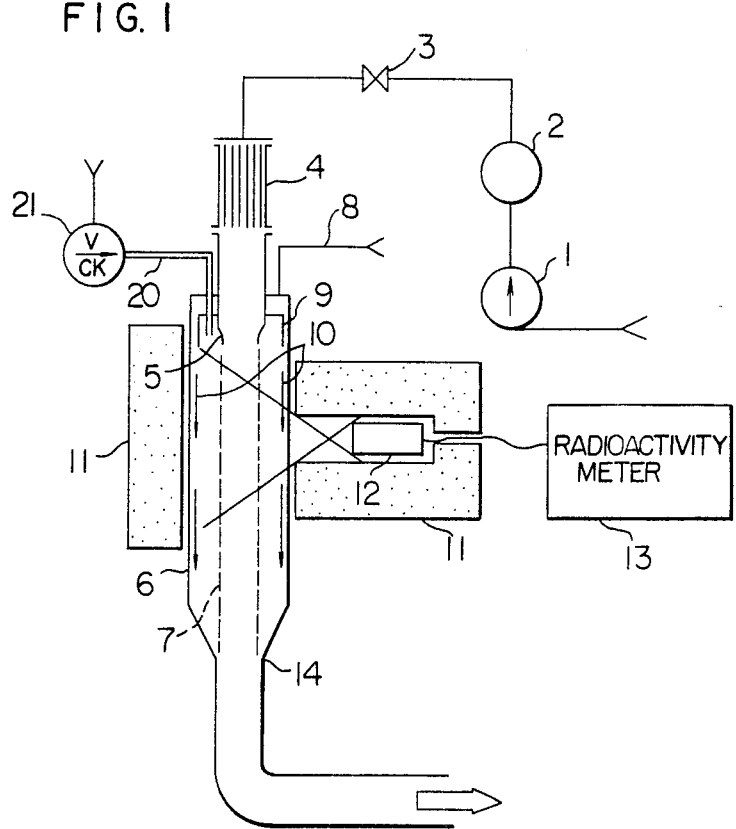
FIG. 1 is a diagrammatical illustration of a radioactivity concentration measuring apparatus constructed in accordance with an embodiment of the invention.

Referring first to FIG. 1, water 7 to be discharged and containing a certain level of radioactivity is moved forcibly by a pump 1, through a flow meter 2, valve 3, flow settling member 4 and a water nozzle 5. The water relieved from the water nozzle 5 is made to fall directly in a measurement pipe 6 without contacting the inner surface of the latter, to permit the continuous measurement of the radioactivity concentration in the water.

A large turbulency of flow of the water 7 is caused at the downstream side of the water nozzle 5 when the supply of water is commenced and when the supply of the water is stopped. In consequence, the water 7 contacts the inner surface of the measurement pipe 6 to cause a radioactive contamination. To wash away the contaminant, means are provided for supplying a fresh cleaning water 10 into the measurement pipe 6, as in the conventional apparatus. The radioactivity concentration measuring apparatus of the invention has a device for inducing the ambient air into the measurement pipe 6 when the pressure in the latter has come down below the atmospheric pressure. This device includes an air supply pipe 20 communicating at its one end with the air layer in the measurement pipe and at its other end with the ambient air, and a check valve 21 disposed in the air supply pipe 20. When the pressure in the measurement pipe has come down below the atmospheric pressure, the check valve 21 is opened so that the ambient air is induced into the measurement pipe 6 through the air supply pipe 20 to recover the pressure in the measurement pipe 6. However, when the pressure in the measurement pipe 6 has become higher than the atmospheric pressure in the transient period of, for example, after the commencement of the discharge of the water, the check valve 21 closes the air supply pipe 20 to prevent the air from coming out of the measurement pipe 6. Thus, the establishment of vacuum in the measurement pipe 6 is suppressed to prevent undesirable rise of the water level in the latter. As a result, the water flows through the measurement pipe 6 without contacting the inner surface of the latter, to permit the continuous measurement of the radioactivity concentration of the water by means of a radioactive ray detector 12 surrounded by a shield 11 and the radioactivity meter 13, without the fear of contamination of the inner surface of the measurement pipe 6 by the radioactive substances.

Figure 2:
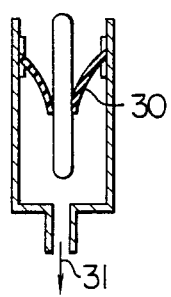
FIGS. 2 and 3 are illustrations of different forms of a check valve incorporated in the apparatus of the invention.
Figure 3:
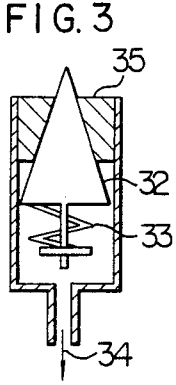

FIGS. 2 and 3 show different examples of the check valve 21 adapted to operate in response to the vacuum. Namely, the check valve shown in FIG. 2 has a flexible valve 30 made of a rubber and adapted to be deflected when the vacuum is established in the measurement pipe 6 to permit the ambient air to be induced into the latter as indicated by an arrow 31. The check valve shown in FIG. 3 has a conical valve member 32 biased by a spring 33 into contact with a valve seat 35. When a vacuum is generated in the measurement pipe 6, the valve member 32 is moved away from the valve seat 35 overcoming the force of the spring 33 to permit the ambient air flow into the measurement pipe 6 as indicated by an arrow 34.

Figure 5:
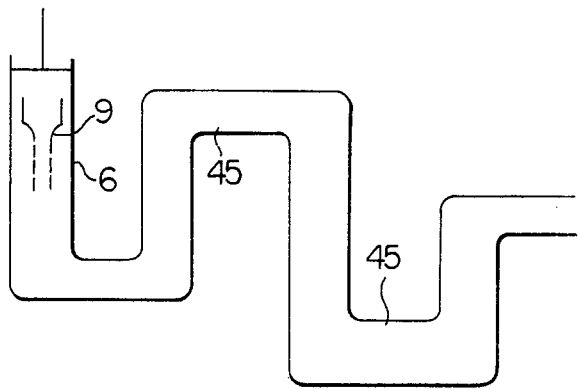
FIG. 5 is a diagrammatical illustration of another embodiment of the invention.

FIG. 5 shows the water outlet system connected to the downstream side of the radioactivity concentration measuring apparatus and having a winding water outlet pipe 45. Apparently, such a winding water outlet pipe imposes a large flow resistance against the flow of water to be discharged. In consequence, the hydrostatic pressure in the measurement pipe 6 is increased to a level above the atmospheric pressure. In such a case, it is impossible to control the water level by the atmospheric pressure transmitted through the air supply pipe. The flow resistance at the downstream side of the measurement apparatus varies depending on the type of the plants in the case of the nuclear power plants.

Figure 4:
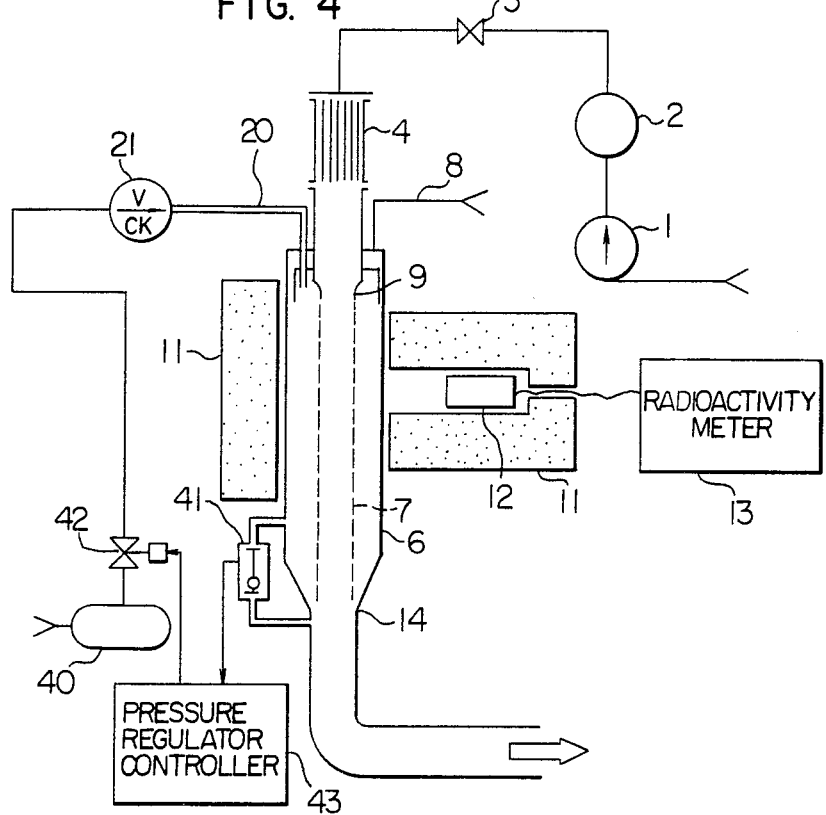
FIG. 4 is an illustration of an example of the reasons of the increase of flow resistance.

FIG. 4 shows a different embodiment of the invention applicable to the case where a hydrostatic pressure higher than the atmospheric pressure is established in the measurement pipe due to the high flow resistance at the downstream side of the latter. In this embodiment, a compressor 40 for supplying air or a gas such as nitrogen gas is connected to the check valve 21 in the air supply pipe 20 to continuously supply the air or gas to the air space in the measurement pipe 6. The supply of the air or gas is made at a pressure higher than the hydrostatic pressure which is determined by the flow resistance of the water outlet system connected to the downstream end of the measurement apparatus, and at a flow rate which is greater than the rate of involvement of the air or gas taking place at a restriction 14 formed at the downstream side end of the measurement pipe 6. A level gauge for detecting the rise of the water level is connected to the lower portion of the measurement pipe 6. A pressure regulator valve 42 under the control of a pressure regulator controller 43 is provided at the delivery side of the gas supplying device such as the compressor 40. The controller 43 controls the pressure regulator valve 42 in accordance with a signal representing the gas supplying pressure and a signal from the level gauge 41 to effectively prevent the rise of the water level. This embodiment can equally be applied to the case where the hydrostatic pressure in the measurement pipe 6 is increased due to the flow resistance imposed by the winding pipe of the water outlet system as shown in FIG. 5. As an alternative, it is possible to continuously and forcibly supply the air or gas at a pressure higher than the hydrostatic pressure which has been measured beforehand in the state of maximum discharge rate of the water. Such a system is advantageous in that no specific control mechanism is needed.

An example of application of the invention to a nuclear power generating plant will be described hereinunder, with reference to FIGS. 6A to 7. Although the illustrated plant is a BWR (Boiling Water Reactor) power generating plant, it is to be noted that the invention is equally applicable to PWR (Pressurized Water Reactor) power generating plant.

Figure 6A:
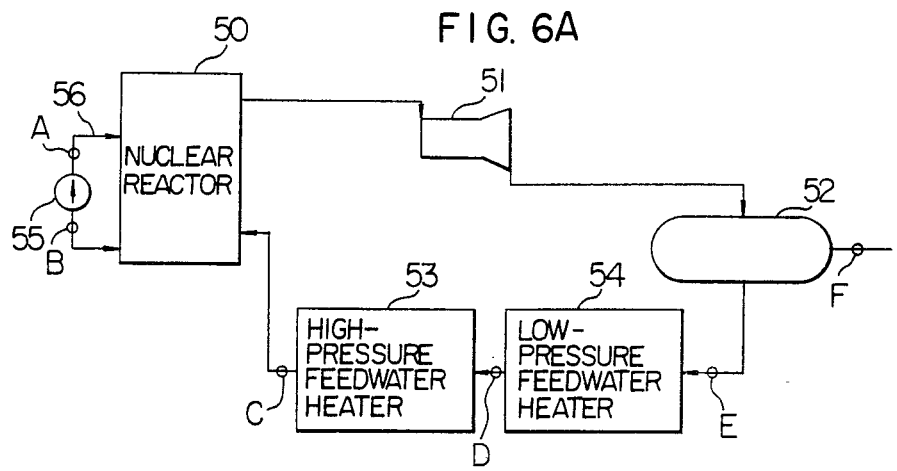
FIGS. 6A, 6B and 7 show examples of applications of the invention.

Referring to FIG. 6A, the BWR plant includes a nuclear reactor 50, steam turbine 51, condenser 52, low-pressure feedwater heater 54, high-pressure feedwater heater 53 and a circulation pump 55 which are connected to form a closed loop through which the working medium is recycled while making change of phase. Actually, the BWR plant includes various other systems, but these systems are omitted from the drawings because they do not constitute any essential part. In this BWR plant, it is necessary to measure the concentration of radioactivity in the liquid (or vapor) at points A, B, C, D, E and F. The points A and B are in the recycling system, points C, D and E are in the heating system and the point F is in the water discharge system of cooling water line.

At the points other than the point F, the measuring apparatus are not disposed in the line pipe but are provided in sampling pipes shunting from the line pipe. Namely, each of sampling pipes is connected at its upstream and downstream ends to the line pipe so that the water or vapor as the measuring object is picked up as the sample from the line pipe and, after the measurement of the radioactivity concentration, returned to the line pipe. Thus, at the points A to E, the measurement of the radioactivity concentration is conducted using a closed pipe system, in contrast to the measurement at the point F in the water discharge system in which the water is discharged to the outside of the system after the measurement of the radioactivity concentration. It is, however, possible to apply the closed type measuring system also to the measurement at the point F.

Figure 6B:
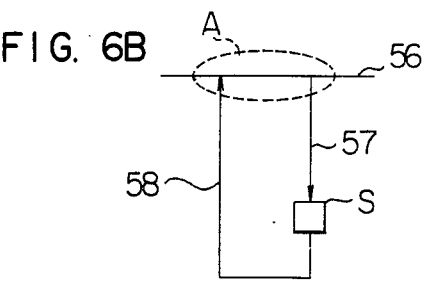

The closed type measuring system permits the measurement of radioactivity concentration in the dangerous area or point at which the level of the radioactivity concentration is specifically high, because the water or vapor after the measurement is returned to the line pipe. On the other hand, however, the closed type measuring system suffers a high flow resistance at the outlet side of the measuring apparatus, because the outlet side of the apparatus is not opened but is connected to the line pipe of a high pressure. In this case, therefore, it is necessary to employ a forcible supply of the ambient air or gas to maintain the optimum water level in the measurement pipe. FIG. 6B shows, by way of example, the closed type measuring system applied to the point A in the recycling system. The sampling pipe for picking up the sample water consists of a pipe 57 branching from the recirculation pipe 56 and a pipe 58 merging in the same. The sample water is picked up from the main line through the pipe 57 and returned to the main line through the pipe 58. The measurement of the radioactivity concentration is made by a measuring apparatus S of the same type as that shown in FIG. 4, connected between two pipes 57 and 58.

Figure 7:
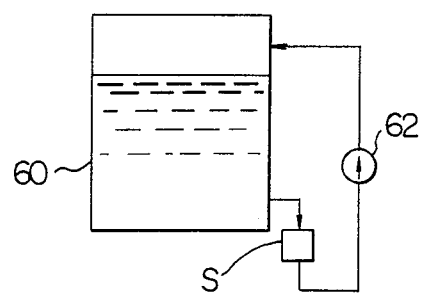

FIG. 7 shows a closed type measuring system for measuring the radioactivity concentration in a condensed waste liquid tank 60 by means of the measuring apparatus of the invention. The sample water is taken out from the tank 60 through the bottom of the latter and is supplied to the measuring apparatus S. The water after the measurement is returned to the upper portion of the tank 60 by means of a pump 62. The liquid in the condensed waste liquid tank 60 usually has an extremely high level of the radioactive concentration, so that the operator cannot approach the tank. It is remarkable that the present invention permits an automatic measurement of the radioactivity concentration of the liquid in the condensed waste liquid tank 60 without requiring the operator to approach the tank.

What is claimed is:

1. An apparatus for measuring concentration of radioactivity in a fluid comprising:
   a radioactivity measurement pipe arranged to extend vertically;
   means for supplying said fluid into said measurement pipe in such a manner that said fluid flows down through said measurement pipe along the axis of said measurement pipe without contacting the inner surface of the latter;
   means disposed at the outside of said measurement pipe for measuring the radioactivity concentration in said fluid flowing through said measurement pipe;
   means for supplying cleaning water to flow down and form a water layer on the inner surface of the measurement pipe;
   a gas layer between the water layer and the fluid flowing along the axis of the measurement pipe;
   a gas supply pipe, separate from said means for supplying cleaning water, supplying gas to the gas layer, provided with a check valve which opens to admit gas when gas pressure in the measurement pipe is lower than ambient gas pressure and which closes when gas pressure within the measurement pipe is greater than ambient gas pressure so as to maintain the gas pressure at least at atmospheric pressure; and
   an outlet pipe provided at the down stream end of the measurement pipe for discharging the fluid to the outside of the measurement pipe.

2. An apparatus according to claim 1, wherein the outlet pipe comprises at least one restriction in diameter.

3. An apparatus according to claim 1, wherein the gas supplied is air.

4. An apparatus for measuring concentration of radioactivity in a fluid as claimed in claim 1, characterized by further comprising means for forcibly supplying a gas of a pressure higher than a predetermined pressure into said measurement pipe through said check valve and said gas supply pipe, said predetermined pressure being the hydrostatic pressure established in said measurement pipe at the maximum flow rate of said fluid in said measurement pipe.

5. An apparatus for measuring concentration of radioactivity in a fluid comprising:
   a radioactivity measurement pipe arranged to extend vertically;
   means for supplying said fluid into said measurement pipe in such a manner that said fluid flows down through said measurement pipe along the axis of said measurement pipe without contacting the inner surface of the latter;
   means disposed at the outside of said measurement pipe for measuring the radioactivity concentration in said fluid flowing through said measurement pipe;
   means for supplying cleaning water to flow down and form a water layer on the inner surface of the measurement pipe;
   a gas layer between the water layer and the fluid flowing along the axis of the measurement pipe;
   means for forceably supplying pressurized gas to the layer, said means being separate from said means for supplying cleaning water, wherein the gas pressure of the gas forceably supplied is greater than the hydrostatic pressure of the fluid in the measurement pipe and is at least equal to atmospheric pressure; and
   an outlet pipe provided at the down stream end of the measurement pipe for discharging the fluid to the outside of the measurement pipe.

6. An apparatus according to claim 5, wherein said pressurized gas supplying means includes:
   gas supplying means;
   a level gauge for detecting fluid rising in the lower portion of the measurement pipe and producing a signal; and
   a gas pressure regulator valve, responsive to the signal produced by the level gauge, provided at the gas delivery side of the gas supplying means for regulating the pressure of the forceably supplied gas provided to the air layer.

7. An apparatus according to claim 5, wherein the gas supplied is one of nitrogen and air.

8. An apparatus according to claim 5, wherein the outlet pipe comprises at least one restriction in diameter.

* * * * *